United States Patent
Yoshida

[11] Patent Number: 5,321,460
[45] Date of Patent: Jun. 14, 1994

[54] AUTOFOCUSING CONTROLLING APPARATUS FOR CAMERA

[75] Inventor: Hideo Yoshida, Omiya, Japan

[73] Assignee: Fuji Photo Optical Co., Ltd., Saitama, Japan

[21] Appl. No.: 953,127

[22] Filed: Sep. 29, 1992

[30] Foreign Application Priority Data

Oct. 4, 1991 [JP] Japan .................. 3-284217
Oct. 15, 1991 [JP] Japan .................. 3-296270
Oct. 15, 1991 [JP] Japan .................. 3-296271

[51] Int. Cl.$^5$ ........................... G03B 13/36
[52] U.S. Cl. ................................... 354/403
[58] Field of Search .............. 354/403; 356/1, 4; 250/201.4, 201.6

[56] References Cited
U.S. PATENT DOCUMENTS
4,954,861  9/1990  Nagaoka et al.

Primary Examiner—W. B. Perkey
Attorney, Agent, or Firm—Ronald R. Snider

[57] ABSTRACT

An autofocusing controlling apparatus for a camera is disclosed. The controlling apparatus is provided with a beam breakage judging means for judging whether or not there is a breakage in each of the multiple beams received. The beam which has no or the least breakage is selected and autofocusing control is executed on the basis of the information on the subject distance measured by the selected beam, thereby preventing an error in the measurement of the subject distance due to a shift of the center of gravity of a beam in the direction of the base length. A light emitting portion includes not only a light emitting device for projecting a light beam onto the object of photography in the panoramic photographing region but also a light emitting device for projecting a light beam onto the object outside the panoramic photographing region so as to measure the distance of the object outside the panoramic photographing region. When the object in the panoramic photography region is judged to extend beyond the panoramic photography region, the user is warned it or the panoramic photography mode is automatically switched over to the ordinary photography mode. If the no-signal state in which there is no information supplied from the object when the subject distance is measured during panoramic photography, the photographing lens is automatically set at the position at which the photographing lens is situated in the distant photography mode, thereby improving the resolution of a panoramic photograph.

6 Claims, 15 Drawing Sheets

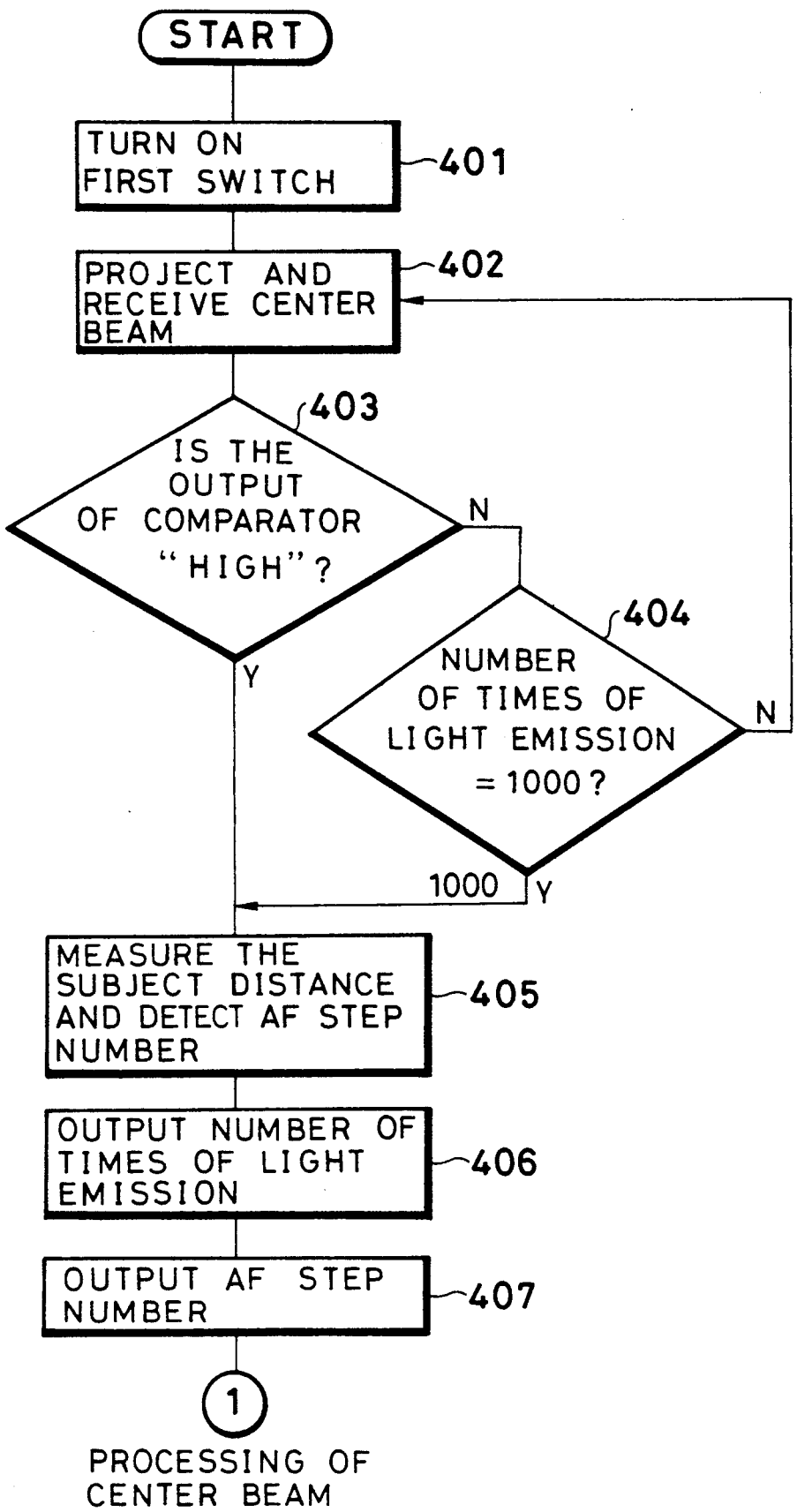

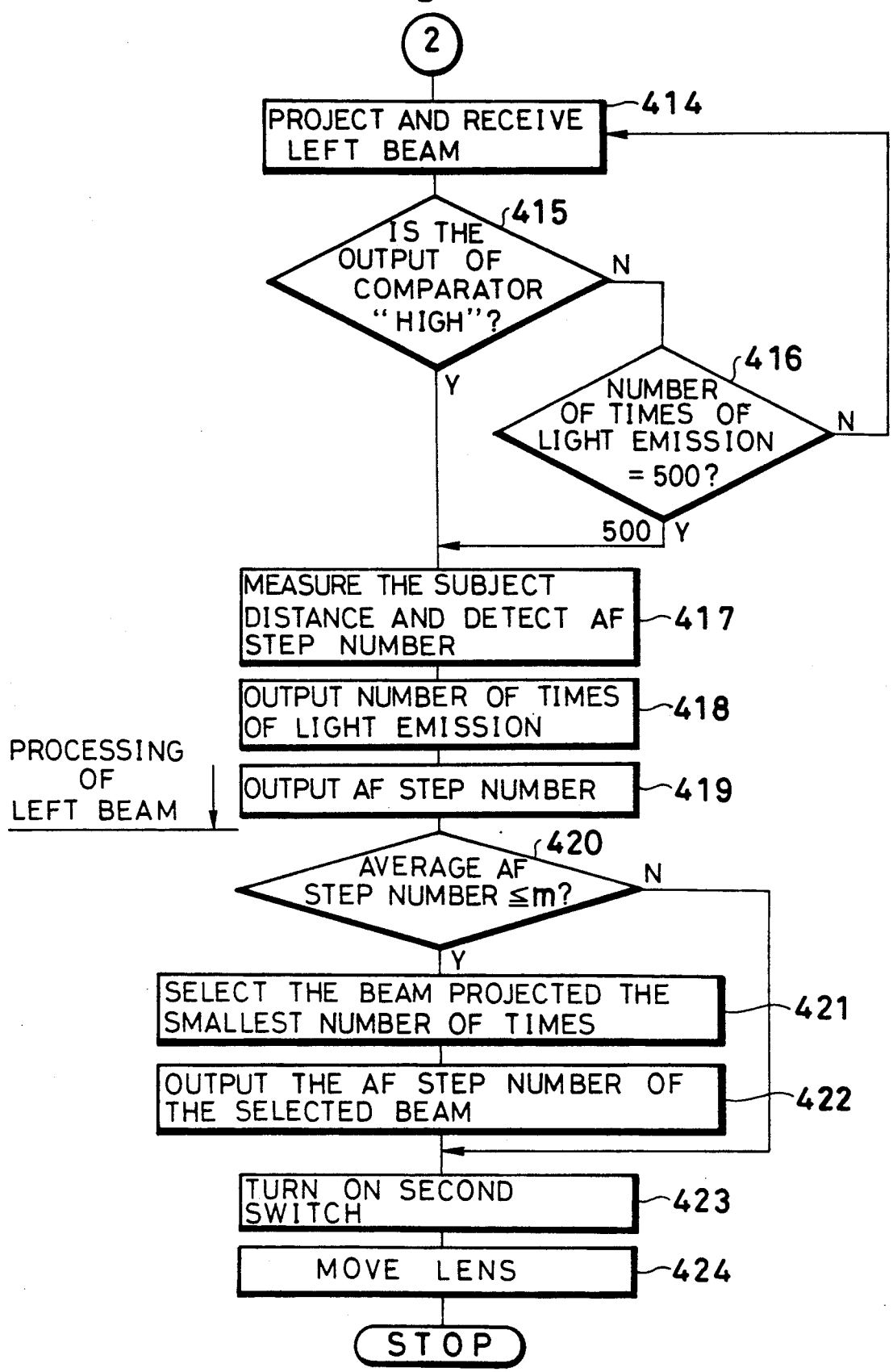

AUTOFOCUSING CONTROLLING APPARATUS FOR CAMERA

BACKGROUND OF THE INVENTION

This application claims the priority of Japanese Patent Application Nos. 3-284217 filed on Oct. 4, 1991 and 3-296270 and 3-296271 filed on Oct. 15, 1991, which are incorporated herein by reference.

1. Field of the Invention

The present invention relates to an active autofocusing apparatus for measuring a subject distance in a camera by using a plurality of beams or one beam.

2. Description of the Related Art

In cameras, autofocusing control is executed by, for example, projecting multiple beams from a light emitting portion onto the object of photography and receiving the light reflected from the object by a light receiving portion. As shown in FIG. 16, a finder 2 and a lens barrel 4 holding a lens 3 are disposed on the front surface of a camera body 1, and an active light emitting portion (infrared light emitting diode) 5 for emitting infrared light and a light receiving portion 6 are disposed in a horizontal line. The light emitting portion 5 and the light receiving portion 6 measure the subject distance and outputs the autofocusing (AF) step number, as shown in FIGS. 17A and 17B.

In FIG. 17A, when beams are projected from the light emitting portion 5 onto the objects at different distances $P_1$, $P_2$, the beams reflected from the objects are received by a light receiving device 6B through a light receiving lens 6A. At this time, the light receiving device 6B receives the beam reflected from the object which is at a distance of $P_1$ at a position $p_1$, and the beam reflected from the object which is at a distance of $P_2$ at a position $p_2$, as shown in FIG. 17B. It is therefore possible to measure the subject distance from the position at which the beam is received by the light receiving device 6B. The AF step number which corresponds to the subject distance is allotted to the light receiving device 6B for the purpose of autofocusing control. The center 200 of gravity of the received beam (indicated by the broken line) 100 is first detected, and when the detected value is output from the light receiving device 6B as information on the measured subject distance, the AF step number is determined on the basis of the information. In this case, the light emitting portion 5 subsequently outputs three beams onto different positions of an object 7, as shown in FIGS. 18A and 18B, in order to accurately measure the subject distance. The AF step number is determined on the basis of these three beams, and the lens 3 is driven in accordance with the information on the AF step number, thereby focusing the lens 3 on the object 7.

In conventional autofocusing control by using multiple beams, however, when a projected beam is not completely impinged on the object 7 but is broken in the direction of the base length, as shown in FIG. 18A, the center of gravity of the beam changes, which causes an error in the measurement of the subject distance. More specifically, as shown in FIG. 17B, while the center of gravity of the beam 100 having a round section (indicated by the broken line) is situated at the position 200, the center of gravity of a beam 101 having a semicircular section (indicated by the solid line) deviates to the position 201. Therefore, although "n" should be output as the AF step number, "n−1" is actually output, so that autofocusing control becomes inaccurate.

FIG. 19 shows the AF step numbers output when one beam is projected and the camera body is swivelled by a predetermined angle. FIG. 20 shows the AF step numbers output when three beams are projected and the camera body is swivelled by a predetermined angle. In FIGS. 19 and 20, the portions A show the AF step numbers produced when there is no breakage of beam, and the portion B in which the AF step numbers are smaller (the subject distance is shorter) corresponds to the beam 101 in FIG. 17B, namely, the case in which the left side (the projected circle of the beam is reversed side to side by the projection lens) of the beam 101 is broken. The portion C in which the AF step number is larger (the subject distance is longer) is the case in which the right side of the beam is broken. In other words, the portions B and C in which the beam is broken are NG regions in which the lens 3 is out of focus. This is no problem when the object is in such a long distance that only one beam is projected onto the object 7, as shown in FIG. 18B, but becomes a problem when the object 7 is at such a short distance that at least two beams are impinged on the object 7, as shown in FIG. 18A. When there are at least two beam outputs, the smallest AF step number output is selected in a conventional autofocusing controlling apparatus. Especially, when the left side of a beam is broken, focus control is executed in the NG region shown by the portions B in FIG. 20.

Panoramic cameras for taking a photograph in a wide photographing range are conventionally known. There are panoramic cameras exclusively for panoramic photography and cameras which selectively enables both ordinary photography and panoramic photography. In a camera which enables both ordinary photography and panoramic photography by switching the photographing modes, a mask is set at the upper and lower portions of the exposing portion so as to cover the upper and lower portions of the film and an indicating frame which indicates the panoramic photography region is displayed in the finder in the panoramic photography mode.

In such a panoramic camera, autofocusing control is executed under an active system or the like using infrared light, ultrasonic waves, or the like. In the case of using infrared light, for example, infrared beams 110 (e.g., three beams) are projected onto the object 7 from the light emitting device, as shown in FIGS. 21A and 21B, so as to measure the subject distance, and the lens 3 is focused on the object 7 on the basis of the information on the measured subject distance.

In a conventional panoramic camera, however, the upper and lower portions of the photographed image of the object are sometimes missing. As shown in FIGS. 21A and 21B, an indicating frame 9 for indicating the panoramic photography region is displayed in a finder 8 in the panoramic photography mode but, sometimes, the indicating frame 9 is not utilized effectively. For example, although the indicating frame 9 is comparatively paid attention to immediately after the mode is changed over to the panoramic photography mode, while pictures are taken in the panoramic photography mode in combination with ordinary photography, the user may sometimes forget that the photographing mode is now the panoramic photography mode and take pictures without special attention to the indicating frame 9. In addition, the user may sometimes disregard the indicating frame 9 depending upon the photographing state although he is aware of the panoramic photography mode. If a picture is taken in the state shown in FIG. 21B in the panoramic photography mode for thee reasons, the head and the chin of the object are missing in the photographed image.

Furthermore, the indicating frame 9 displayed in the finder 8 may not be completely coincident with the actual panoramic photography region.

FIG. 22 shows an example of an autofocusing control circuit. In FIG. 22, a CPU (central processing unit) is 38 is connected to a subject distance measuring portion 37 which is composed of a light emitting device and a light receiving device, and a lens driving portion 39 is connected to the CPU 38. The CPU 38 executes the control of the camera as a whole and autofocusing control. The CPU 38 is provided therein, for example, with an AF step number setting portion 38A, a no-signal state detecting portion 38B and a lens movement control portion 38C. The camera is also provided with a panoramic photography button (not shown) for selecting the panoramic photography mode and a distant photography button (not shown) for selecting the distant photography mode.

According to this structure, when the panoramic photography mode is selected by pressing the panoramic photography button, for example, and a photography button is then pressed, autofocusing control is initiated. In the autofocusing control, the subject distance is measured on the basis of the state of the beam received by the light receiving device immediately after the control of the light emission from the light emitting device by the CPU 38, and when the information on the measured subject distance is output to the AF step number setting portion 38A, the AF step number for adjusting the focal length to the subject distance is output to the lens movement control portion 38C. When the lens driving portion 39 is driven by the lens movement control portion 38C, the photographing lens 3 is moved to a predetermined position, and the lens 3 is thereby automatically focused on the object 7.

In this circuit, the no-signal state detecting portion 38B detects that the beam reflected from the object 7 cannot be received by the light receiving device. When the no-signal state is detected, the lens 3 is so controlled as to be moved by a predetermined amount. In this type of camera, when the object 7 is situated at such a long distance as not less than several 10 m, the movement of the photographing lens 3 is generally controlled by a predetermined AF step number without receiving any reflected beam. In the above-described camera, the distant photography button is provided, and when the object 7 at a distance of not less than 100 m is photographed, the photographing lens 3 is so controlled as to focus on the distant object 7 not under autofocusing control but by pressing the distant photography button.

In a conventional camera which enables panoramic photography, however, the amount of lens movement (AF step number) set when the no-signal state is detected by the no-signal detecting portion 38B is appropriate in the ordinary photography mode but it is not always appropriate in the panoramic photography mode, which lead to a problem in the resolution of a picture. To state this more concretely, in panoramic photography for photographing a wide picture, the lens 3 is often focused on the object 7 at a comparatively long distance. In addition, in a panoramic camera, since a mask is generally disposed on the upper and lower portions of an ordinary film so as to take a picture while narrowing the vertical exposing range in the film, the enlargement ratio of the picture at the time of printing is larger than a picture taken in the ordinary photography mode. Therefore, if the amount of lens movement in the no-signal state in the panoramic photography mode is so set that the focal length is longer than that in the ordinary photography mode, it is possible to obtain a panoramic picture which is in focus.

SUMMARY OF THE INVENTION

Accordingly, it is a first object of the present invention to eliminate the above-described problems in the related art and to provide an autofocusing controlling apparatus for a camera which is capable of accurate focusing control without an error caused by the breakage of a beam.

It is a second object of the present invention to provide an autofocusing controlling apparatus for a camera which is capable of detecting a photographing state in which some parts of the object will be missing in the photographed image so as to prevent such a defective picture from being taken.

It is a third object of the present invention to provide an autofocusing controlling apparatus for a panoramic camera which is capable of improving the resolution of a picture which is taken in a no-signal state in which there is no information supplied from the object in panoramic photography.

To achieve the first object, an autofocusing controlling apparatus for a camera according to the present invention comprises: a light emitting portion for projecting multiple beams onto the object of photography; a light receiving portion for receiving each of the beams reflected from the object and outputting the information on the subject distance measured on the basis of the position at which each beam is received; and a beam breakage judging means for judging whether or not there is a breakage in each of the multiple beams which are received by the light receiving portion, wherein the beam which has no breakage or the least breakage in the direction of the base length which connects the light emitting portion and the light receiving portion is selected on the basis of the output of the beam breakage judging means, and autofocusing control is executed on the basis of the information on the subject distance measured by the selected beam. If two beams are received, for example, and both of them have a breakage, the beam which has the smaller breakage of the two is selected.

In the above-described structure, the beam breakage judging means judges whether or not there is a breakage in each beam on the basis of the quantity of light of each beam. The quantity of light of each beam is measured by the time (number of times of light emission) required until a predetermined quantity of light is obtained, or the quantity of light per predetermined time. For example, if there is a breakage in a beam, it takes a long time until the quantity of light of the beam reaches a predetermined value. Consequently, the beam which has obtained a predetermined quantity of light in the shortest time is specified and selected from the multiple beams as the beam having no (or the least) breakage. The AF step number which corresponds to the information on the subject distance measured by the beam having no or the least breakage, for example, the value of the measured subject distance is output, and the lens is driven in accordance with the AF step number for the purpose of autofocusing.

To achieve the second object, an autofocusing controlling apparatus for a panoramic camera according to the present invention is characterized in that the light emitting portion is provided with a light emitting device for projecting a light beam onto the object in the panoramic photography region and a light emitting device for projecting a light beam onto the object outside the panoramic photography region so as to measure the distance of the object outside the panoramic photography region.

The autofocusing controlling apparatus may also comprise a warning means for warning the user that the object in the panoramic photography region extends beyond the panoramic photography region in accordance with the information on the measured subject distance which is obtained by projecting a beam onto the object outside the panoramic photography region. Alternatively, the autofocusing controlling apparatus may also comprise a mode switching means for automatically switching the panoramic photography mode over to the ordinary photography mode when the object in the panoramic photography region is judged to extend beyond the panoramic photography region.

According to the above-described structure, beams from the light emitting device provided at the middle stage of the panoramic photography region and the light emitting device provided at the upper (or lower) stage outside the panoramic photography region are subsequently projected onto the object. The beams reflected from the object are received by the light receiving device, and the subject distances both within the panoramic photography region and outside the panoramic photography region are measured on the basis of the reflected beams. Whether or not the subject distance outside the panoramic photography region is the same as that within the panoramic photography region is judged, and if the distance is the same, the user is warned by the warning means, for example, by displaying a warning in the finder that some part of the object will be missing in the photographed image. In this case, the mode switching means may automatically switch the panoramic photography mode over to the ordinary photography mode in place of using the warning means.

To achieve the third object, an autofocusing controlling apparatus for a panoramic camera according to the present invention comprises: a lens movement control portion for controlling the movement of a lens in the distant photography mode; and a no-signal state detecting portion for detecting a no-signal state in which there is no information supplied from the object on the basis of the output of a subject distance measuring means, wherein the photographing lens is automatically set at the position at which the photographing lens is situated in the distant photography mode if the state is judged to be the no-signal state when the subject distance is measured during panoramic photography.

The no-signal state is a state in which the object is situated in such a long distance that the detection of a reflected signal is impossible in autofocusing control. According to the above-described structure, when the no-signal state is detected by the measured subject distance during panoramic photography, the photographing lens is moved to the position at which the lens is situated in the distant photography mode. Consequently, if the no-signal state is detected in the panoramic photography mode, a picture is taken while the focal length is made longer than that in the ordinary photography mode.

The above and other objects, features and advantages of the present invention will become clear from the following description of the preferred embodiments thereof, taken in conjunction with the accompanying drawings.

BRIEF DESCRIPTION OF THE DRAWINGS

FIGS. 7A and 7B are flowcharts of the operation of the first embodiment;

FIG. 8 is a flowchart of the operation of the first embodiment continued from FIG. 7B;

DESCRIPTION OF THE PREFERRED EMBODIMENTS

First Embodiment

Figure 1:
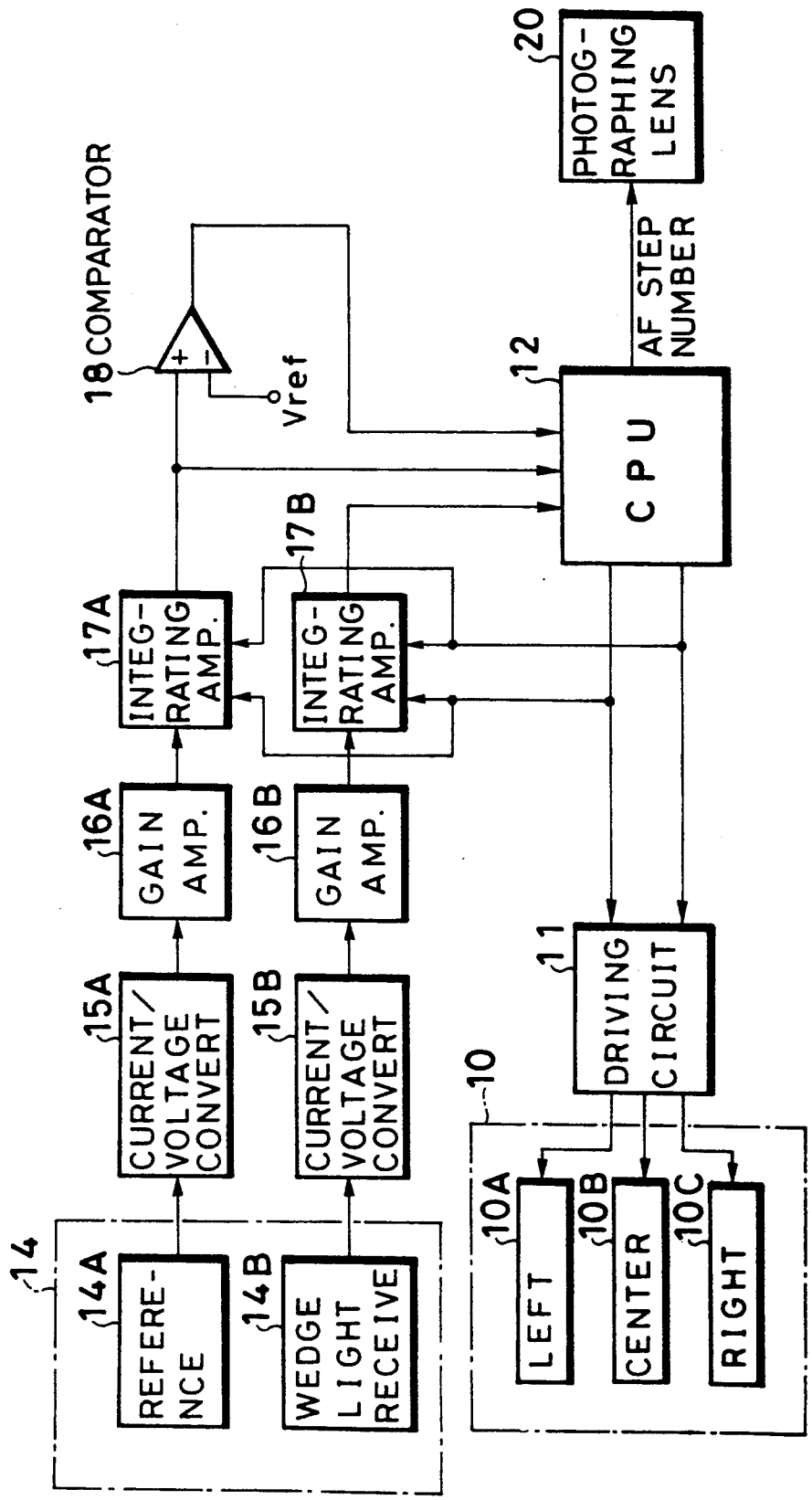
FIG. 1 is a block diagram of the structure of a first embodiment of a multibeam autofocusing controlling apparatus according to the present invention.

FIG. 1 is a block diagram of the structure of a first embodiment of a multibeam autofocusing controlling apparatus according to the present invention. In FIG. 1, a light emitting portion 10 is provided with light emitting diodes 10A, 10B and 10C each for emitting an infrared beam. A CPU (central processing unit) 12 is connected to the light emitting diodes 10A, 10B and 10C through a driving circuit 11. When commands for light emission to the left, central and right light emitting diodes are output from the CPU 12 to a driving circuit 11, the light emitting diodes 10A to 10C are subsequently driven by the driving circuit 11 so as to output pulsating infrared beams in a predetermined order.

Figure 17A:
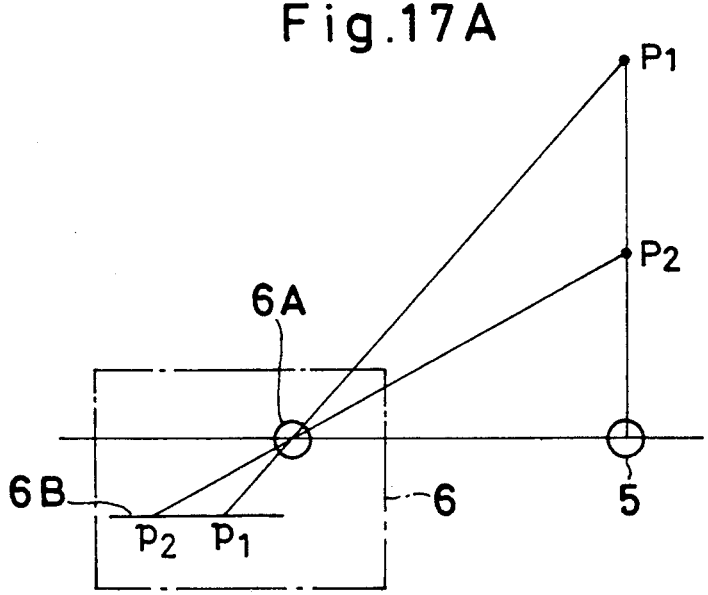
FIG. 17A shows the infrared beams projected and received in the measurement of the subject distance in a conventional apparatus.
Figure 17B:
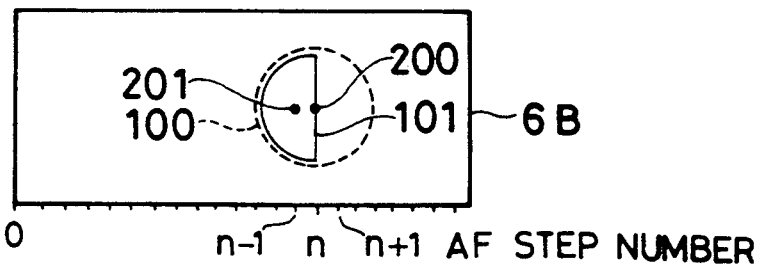
FIG. 17B shows the light receiving device shown in FIG. 17A in the state of receiving the beams.
Figure 18A:
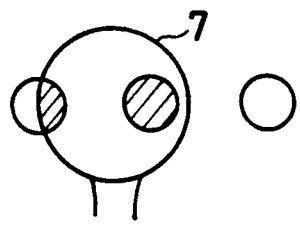
FIGS. 18A and 18B show multiple beams projected onto the object.
Figure 18B:
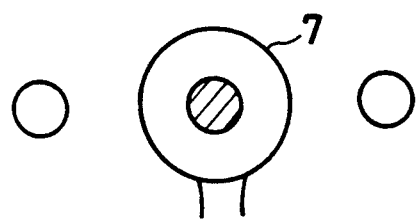
Figure 19:
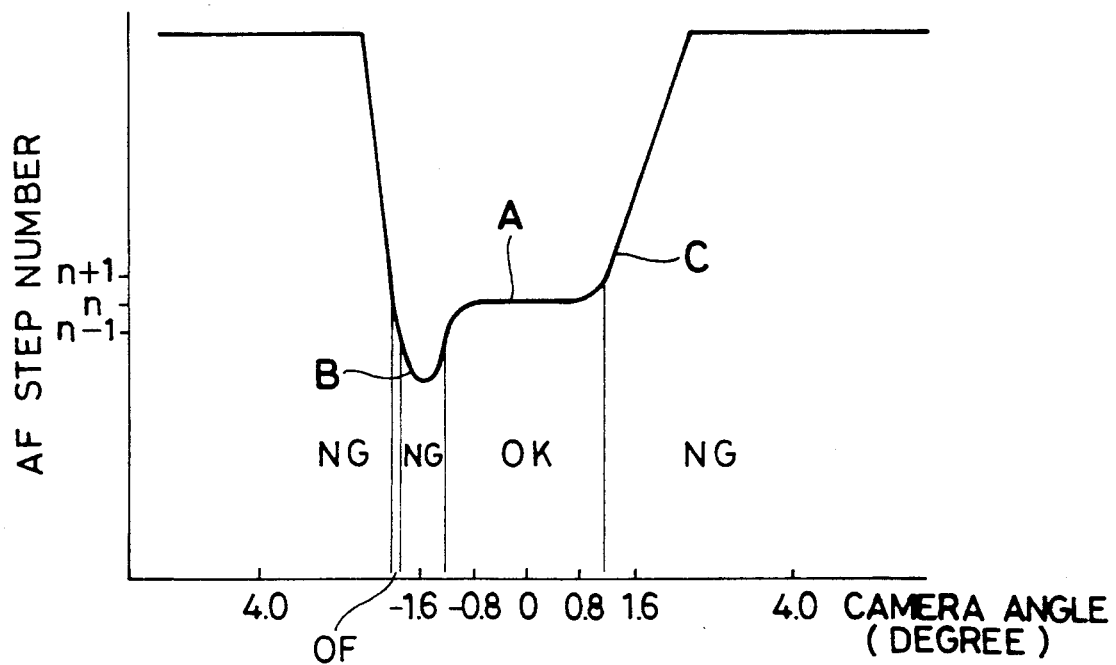
FIG. 19 is a graph showing the changes in the AF step number detected by a conventional apparatus while swivelling a camera by predetermined angles.
Figure 20:
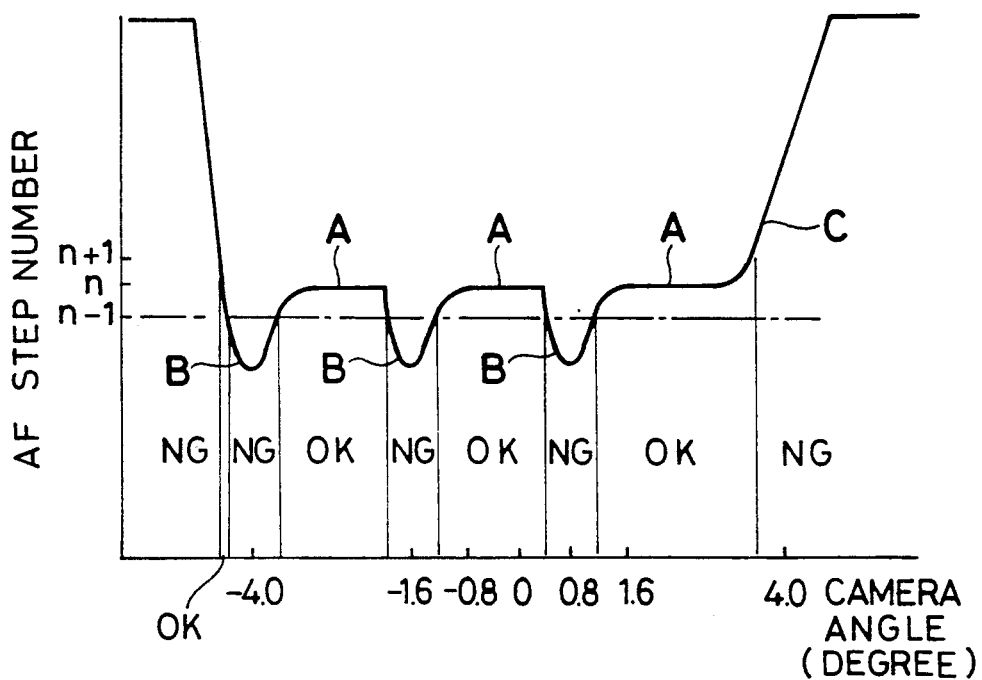
FIG. 20 is a graph showing the changes in the AF step number detected by using three beams in a conventional apparatus while swivelling a camera by predetermined angles.
Figure 21A:
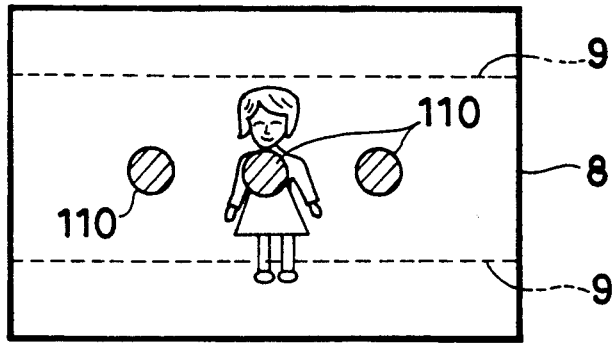
FIGS. 21A and FIG. 21B show the objects displayed in the finder and irradiated with beams when the panoramic photography mode is selected in a conventional panoramic camera.
Figure 21B:
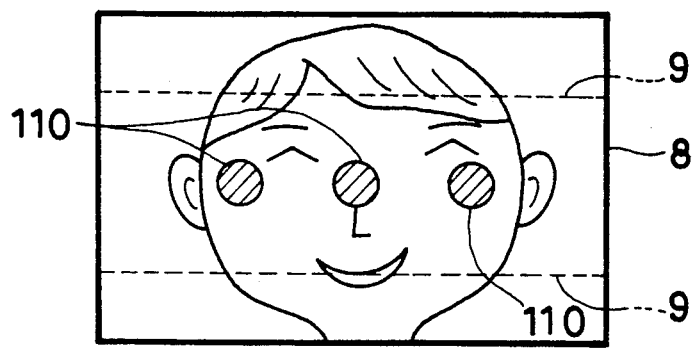
Figure 22:
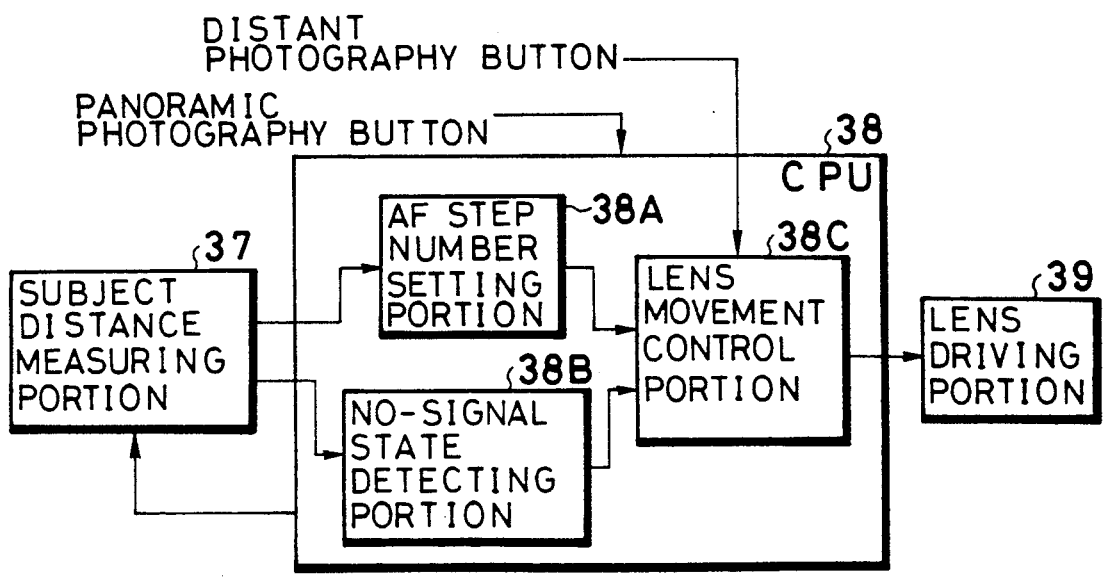
FIG. 22 is a block diagram of the structure of a conventional autofocusing controlling apparatus for a camera.

A light receiving portion 14 is provided with a reference light receiving device 14A and a wedge light receiving device 14B. The reference light receiving device 14A specifies the quantity of light of each beam received, and the wedge light receiving device 14B is provided with a wedge-shaped mask. By virtue of the wedge-shaped mask, the quantity of light of each beam changes depending upon the position in the direction of the base length (the line connecting the light emitting portion 10 and the light receiving portion 14) at which the beam is received, so that it is possible to measure the subject distance from the quantity of light of the beam received by the wedge light receiving device 14B. That is, these light receiving devices 14A, 14B are provided in order to measure the subject distance from the position of each beam received in the direction of the base length and specify the AF step number in the same way as shown in FIG. 17B. A current/voltage converting amplifier 15A for removing an unnecessary external beam and converting the current of the infrared beam into the voltage thereof, a gain amplifier 16A and an integrating amplifier 17A for integrating the pulsating infrared beam are connected to the subsequent stage of the reference light receiving device 14A. In the same way, a current/voltage converting amplifier 15B, a gain amplifier 16B and an integrating amplifier 17B are connected to the wedge light receiving device 14B.

On the reference light receiving device 14A side, a comparator 18 is provided at the subsequent stage of the integrating amplifier 17A. The comparator 18 compares the reference voltage with the output voltage of the integrating amplifier 17A so as to judge whether or not the quantity of light of the beam received by the reference light receiving device 14A has reached a predetermined quantity of light. The outputs of the integrating amplifiers 17A, 17B and the comparator 18 are supplied to the CPU 12. The CPU 12 compares the output of the integrating amplifier 17A on the reference light receiving device 14A side with the output of the integrating amplifier 17B on the wedge light receiving device 14B side so as to measure the subject distance from the received beam from position (center of gravity) at which the beam is received. The AF step number is detected from the measured subject distance and the result is output. From the output of the comparator 18, whether or not the quantity of light of each beam received has reached a predetermined quantity of light is judged. The CPU 12 detects how many times each beam has been projected until it obtains the predetermined quantity of light. Among the multiple beams received, the beam which has been projected the smallest number of times, in other words, the beam which has obtained the predetermined quantity of light in the shortest time is judged to be the beam having no (or the least) breakage. The AF step number of this beam is finally selectively output. The CPU 12 drives a photographing lens 20 on the basis of the final AF step number.

The AF step number detected by the above-described circuit will now be explained with reference to FIGS. 2 to 6. FIGS. 2A to 2G show the beams projected onto an object 7 when the camera is swivelled by about ±4 degrees from the center (±0) of the camera. The changes in the AF step number detected under these conditions are shown in FIG. 3. FIG. 4 shows the shape of the beams received by the wedge light receiving device 14B. The beam with the right portion broken, as shown in (A), corresponds to the beams with the left portion broken (the projected circle of the beam is reversed side to side when it is received) shown in FIGS. 2B, 2F and 2G. In the beam shown in (A), the center of gravity shifts to the left by a distance d1. On the other hand, the beam with the left portion broken, as shown in (C), corresponds to the beams with the right portion broken shown in FIGS. 2C, 2D and 2E. In this case, the center of gravity shifts to the right by a distance d2. Therefore, if there is a breakage at the left portion in the center, left or right beam in FIG. 3, the subject distance is misjudged to be shorter, as shown in (B), and the AF step number shifts toward a smaller number. On the other hand, if there is a breakage at the right portion of a projected beam, the subject distance is misjudged to be longer, as shown in (C), and the AF step number shifts toward a larger number.

Figure 5:
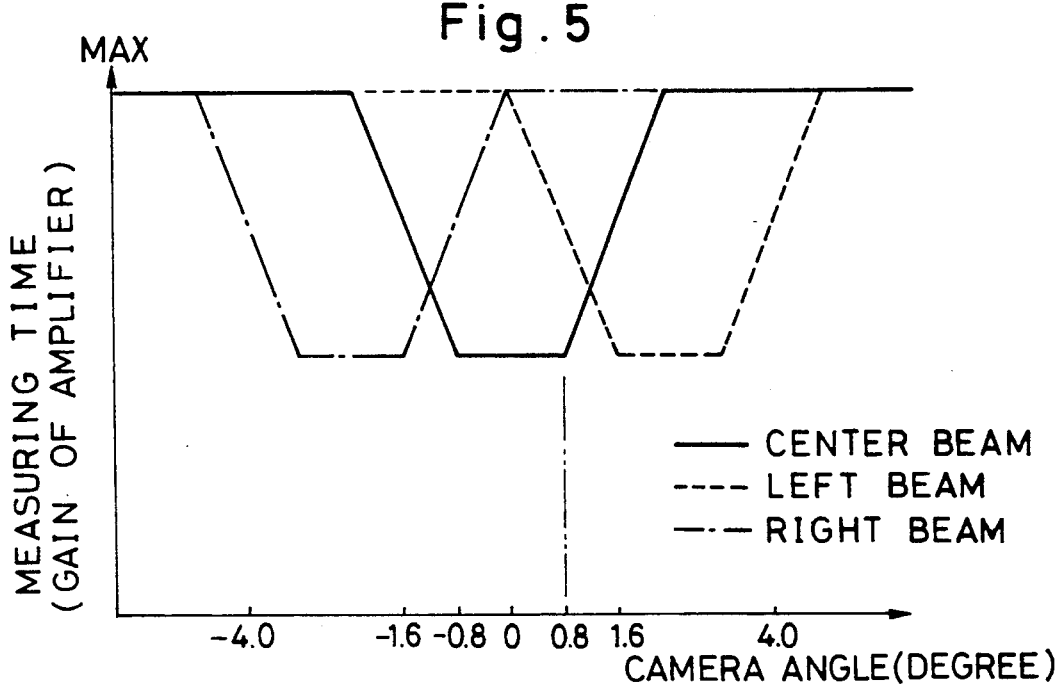
FIG. 5 is a graph showing the measuring time of each beam required under the conditions shown in FIG. 2.
Figure 6:
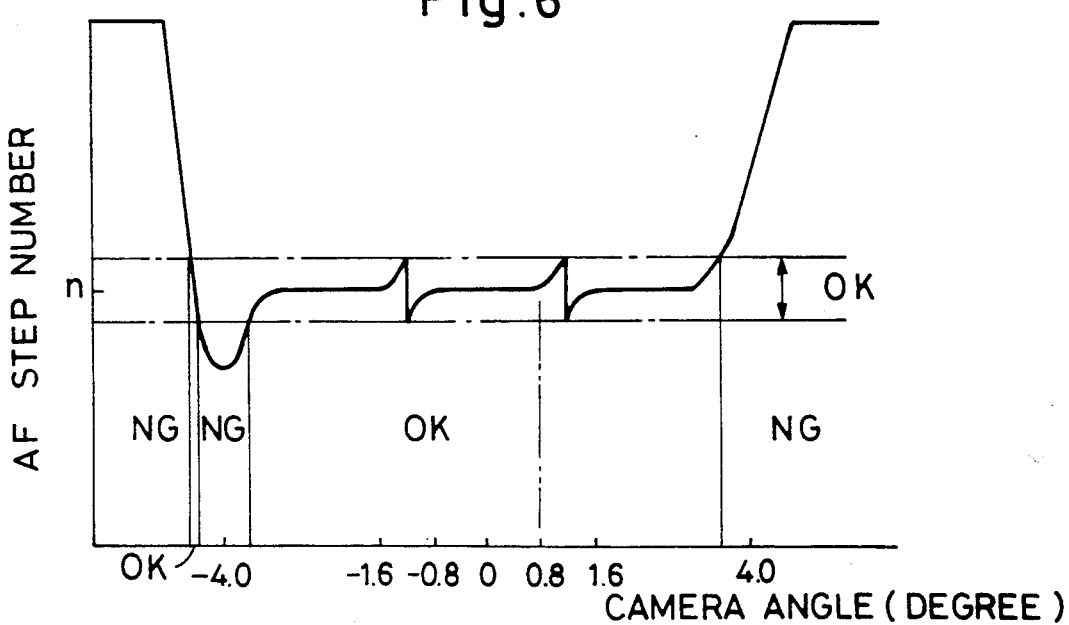
FIG. 6 is a graph showing changes in the AF step number finally obtained in the first embodiment.

In this embodiment, however, the comparator 18 and the CPU 12 detect how many times each beam has been projected until it obtains the predetermined quantity of light so as to judge whether or not there is a breakage of the beam, and determines the AF step number on the basis of the beam having no or the least breakage, as described above. FIG. 5 shows the measuring time (or the gain of the amplifier) of each beam required when the camera is swivelled by about ±4 degrees. The beam requiring the shortest measuring time is selected from FIG. 5. From the measured values shown in FIG. 3 with due consideration of the measuring time shown in FIG. 5, the AF step numbers shown in FIG. 6 are obtained. Although there is a little variation at the switching point of each beam, since the variation is within the focal depth, there is no problem. In addition, FIG. 6 shows the critical state in which one of the three beams is constantly projected onto the object 7, and if the object 7 is at a shorter distance, the variation becomes smaller.

The operation of the first embodiment having the above-described structure will now be explained with reference to FIGS. 7 and 8. When a first switch S is turned on by pressing a photography button at step 401 in FIG. 7A, the center beam is processed at the steps 402 to 407. At step 402, the center beam is projected by the light emitting diode 10B, received by the light receiving devices 14A and 14B, and integrated. At the next step 403, whether or not the output of the comparator 18 is at a High level, namely, higher than the reference voltage is judged. If the answer is "N", the process proceeds to the step 404. At the step 404, whether or not the number of times of light emission is not smaller than 1000, for example, is judged. If the answer is "N", the process proceeds to the step 402. If the answer is "Y" at the step 404, the process proceeds to the step 405. This processing is executed in order to stop the comparison by the comparator 18 when the object 7 is at a longer distance than a predetermined distance.

When the answer is "Y" at the step 403, the process proceeds to the step 405, and the CPU 12 compares the integrated level by the reference light receiving device 14A and the integrated level by the wedge light receiving device 14B so as to measure the subject distance and detect the AF step number shown in FIG. 3. At the step 406, how many times the center beam has been projected until the comparator 18 outputs "High" at the step 403 is detected and the result is output. At the step 407, the AF step number of the center beam detected at the step 405 is output.

Figure 7B:
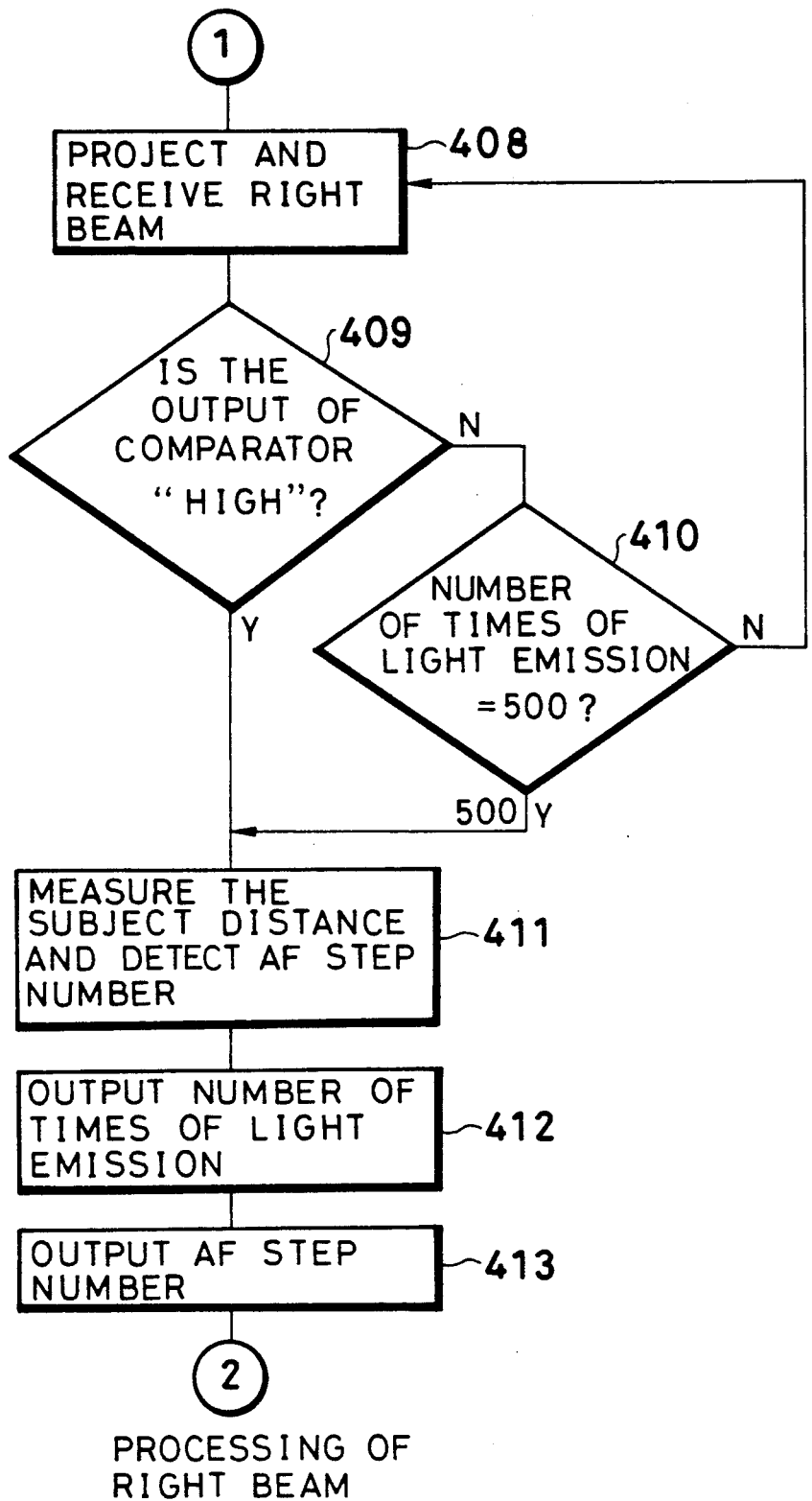

The right beam is then processed at steps 408 to 413, as shown in FIG. 7B, in the same way as in the processing of the center beam. At the step 412, how many times the right beam has been projected until the right beam obtains a predetermined quantity of light is detected and the result is output. At the step 413, the AF step number of the right beam is output. At the step 410, whether or not the number of times of light emission is not smaller than 500, for example, is judged and at the point of time in which the number of times of light emission reaches 500, the comparison by the comparator 18 is stopped. This is because the right or left beam is often projected beside the object 7.

Finally, the left beam is processed at steps 414 to 419, as shown in FIG. 8, in the same way as in the processing of the center beam. At the step 418, how many times the left beam has been projected until the left beam obtains a predetermined quantity of light is detected and the result is output. At the step 419, the AF step number of the left beam is output. At the next step 420, the AF step numbers detected by the three beams are compared. In this embodiment, whether the object 7 is within a predetermined distance is judged by judging whether or not the average value of the AF step numbers is not more than m. If the average value is more than m, it means that the object is at a longer distance than the predetermined distance. In this case, the process proceeds to step 423 without judging whether or not there is a breakage in each beam. On the other hand, if the average value is less than m, the process proceeds to step 421. At the step 421, the beam which has been projected the smallest number of times is selected among the three beams, and at the subsequent step 422, the AF step number of the selected beam is output as the final AF step number.

Figure 2A:
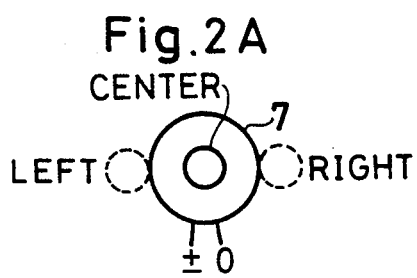
FIGS. 2A to 2G are explanatory views of the beams projected when the camera is swivelled by various angles with respect to the object of photography.
Figure 2B:
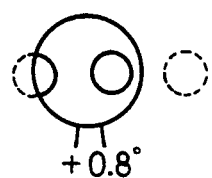
Figure 2C:
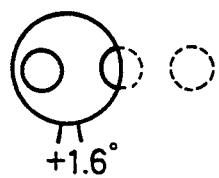
Figure 2D:
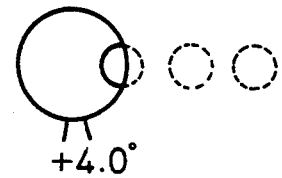
Figure 2E:
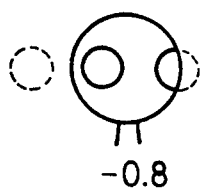
Figure 2F:
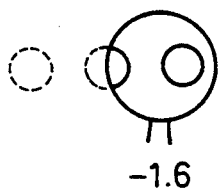
Figure 2G:
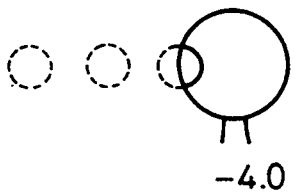
Figure 3:
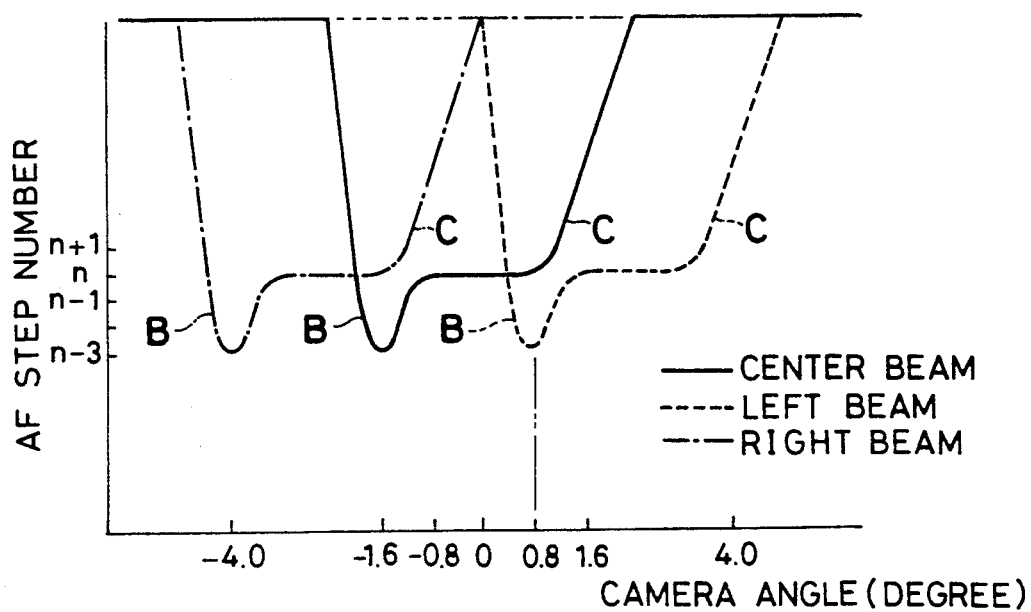
FIG. 3 is a graph showing the changes in the AF step number detected under the conditions shown in FIGS. 2A to 2G.
Figure 4:
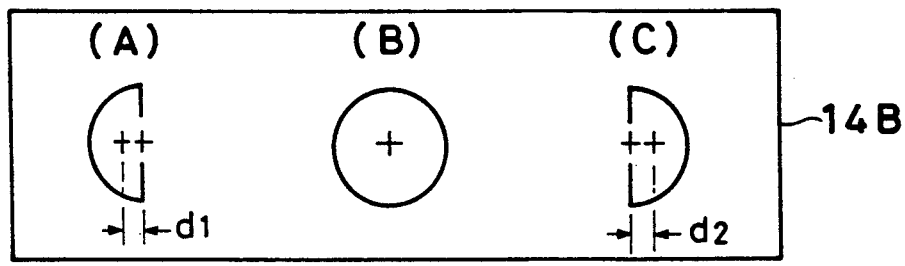
FIG. 4 is an explanatory view of the center of gravity of a beam shifted when there is a breakage in the beam.

For example, if the camera is swiveled by +0.8 degree, as shown in FIG. 2B, the portion B of the left beam is selected and the AF step number is (n−3) in a conventional apparatus, as shown in FIG. 3. In this embodiment, however, since the beam which is projected the smallest number of times is the center beam, as shown in FIG. 5, the AF step number n of the center beam is finally selected, as shown in FIG. 6. After the AF step number is output at the step 422, a second switch S of the photography button is operated at the step 423. At step 424, the photographing lens is moved to the predetermined position in accordance with the AF step number. In this way, photography is finished under the accurate autofocusing control.

In the first embodiment, a breakage of each beam received by the reference light receiving device 14 is judged from the number of times (time) of each beam which has been projected until it obtains a predetermined quantity of light. It is also possible to judge a breakage of each beam by the gain of an amplifier, namely, the intensity of each beam received. The beam received may be broken not only in the direction of the base length but also in the vertical direction. If all the beams received have a breakage, the beam having the least breakage is treated as a beam having no breakage.

The light emitting portion 10 and the light receiving portion 14 are disposed in a horizontal line of the camera and a breakage of a beam in the direction of the base length is judged in this embodiment. If the light emitting portion 10 and the light receiving portion 14 are disposed in a vertical line of the camera, the center of gravity of a beam shifts in the direction of the base length. In this case, a breakage of the beam in the vertical direction is judged by the present invention.

As explained above, according to the first embodiment, since a beam breakage judging means for judging whether or not each beam has a breakage is provided and autofocusing control is executed in accordance with the information on the subject distance measured by the beam having no or the least breakage which is selected by the beam breakage judging means, accurate autofocusing control is enabled.

Second Embodiment

Figure 9:
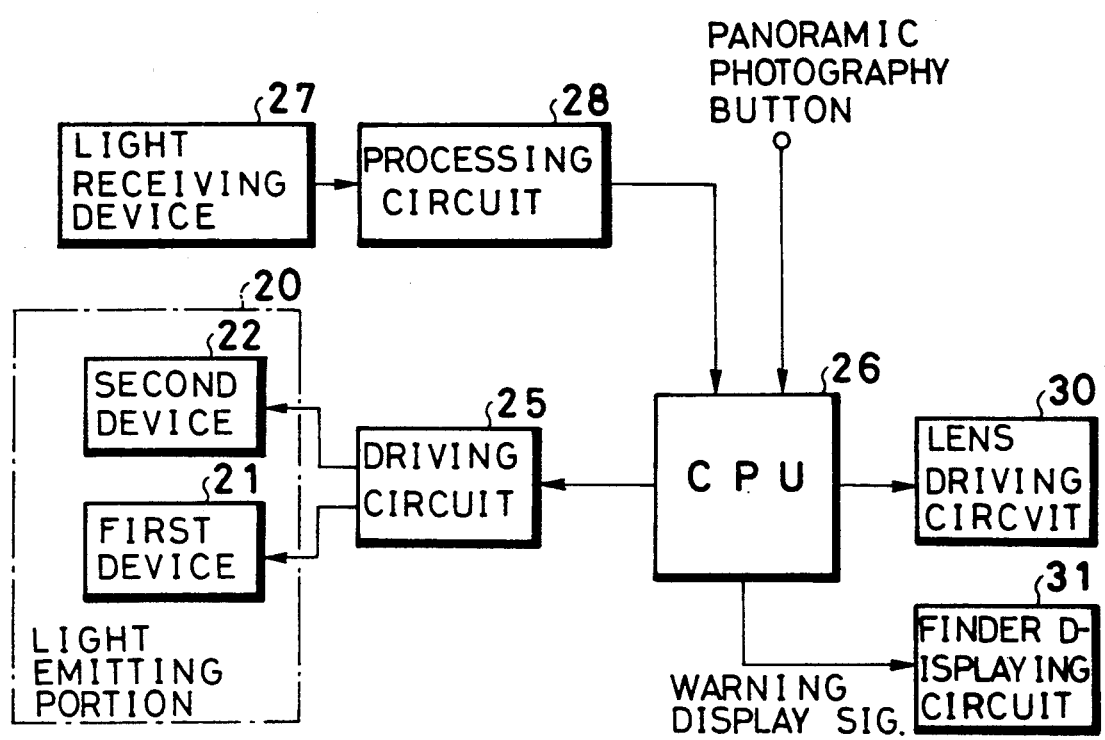
FIG. 9 is a circuit diagram showing the structure of a second embodiment of an autofocusing controlling apparatus for a panoramic camera according to the present invention.
Figure 10A:
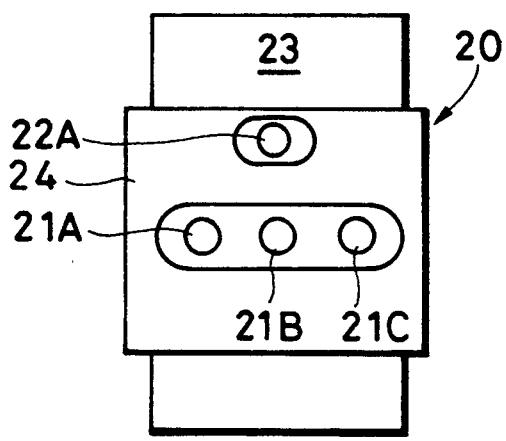
FIG. 10A is a top view of the structure of a light emitting device of the second embodiment.
Figure 10B:
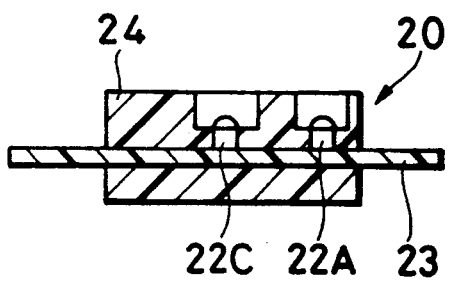
FIG. 10B is a central vertical sectional view of the light emitting device shown in FIG. 10A.

FIG. 9 is a circuit diagram showing the structure of a second embodiment of an autofocusing controlling apparatus for a panoramic camera according to the present invention. FIGS. 10A and 10B show the structure of a light emitting device. In FIG. 9, a light emitting portion 20 is provided with a first light emitting device 21 and a second light emitting device 22 each composed of a light emitting diode for emitting infrared light. In this case, the first light emitting device 21 measures the subject distance with respect to the object in the panoramic photography region (ordinary region in the ordinary photography mode), and the second light emitting device 22 measures the subject distance with respect to the upper portion of the object which is beyond the panoramic photography region. The light emitting devices 21, 22 may be composed of separate devices but, in this embodiment, they are integrally formed, as shown in FIGS. 10A and 10B.

As shown in FIGS. 10A and 10B, the light emitting portion 20 is provided on a lead frame 23. The light emitting portion 20 is composed of three light emitting (diode) chips 21A, 21B and 21C as the first light emitting device 21, and a light emitting chip 22A as the second light emitting diode 22. In this embodiment, multibeam autofocusing control is executed by using the first light emitting device 21. A resin mold 24 is formed on the upper and lower surfaces of the lead frame 23.

In FIG. 9, a CPU 26 is connected to the light emitting portion 20 through a driving circuit 25. When a light emission control signal is output from the CPU 26 to the driving circuit 25, the light emitting portion 20 is driven by the driving circuit 25 so as to output pulsating infrared beams. In this embodiment, after three beams are subsequently projected by the first light emitting device 21, a light beam is projected from the second light emitting device 22. A light receiving portion 27 is provided with, for example, a reference light receiving device and a wedge light receiving device. The reference light receiving device specifies the quantity of light of each beam received, and the wedge light receiving device measures the subject distance from the position of each beam received in the direction of the base length (the line connecting the light emitting portion 20 and the light receiving device 27).

A processing circuit 28 including a current/voltage converting amplifier for removing an unnecessary external beam and converting the current of the infrared beam into the voltage thereof, an integrating amplifier for integrating the input voltage, etc. is connected to the light receiving device 27, and the CPU 26 is connected to the processing circuit 28. A switching signal is input to the CPU 26 by the operation of a panoramic photography button which is provided on the camera so as to switch the ordinary photography mode to the panoramic photography mode. A lens driving circuit 30 for moving a photographic lens and a finder displaying circuit 31 for displaying in the finder 8 are also connected to the CPU 26.

The finder displaying circuit 31 is, for example, so designed as to turn on a red lamp provided in the finder 8 or on the periphery of the finder 8 when the object in the panoramic photography region is judged to extend beyond the panoramic photography region. Alternatively it is possible to warn the user that some part of the object will be missing in the photographed image by displaying it in letters or a mark at a predetermined place in the finder 8.

The operation of the second embodiment having the above-described structure will now be explained with reference to FIGS. 1A to 12B. When a first switch S is turned on by pressing a photography button, the operation of measuring the subject distance is initiated. Pulsating infrared beams are projected from the light emitting portion 20 by the driving circuit 25 in accordance with the light emission control signal which is output from the CPU 26. In this embodiment, three beams 110, namely, a center beam, a left beam and a right beam are projected from the first light emitting device 21 and thereafter an upper beam 111 is projected from the second light emitting device 22, onto the object. The beams reflected from the object are received by the light receiving device 27. The light reception signals are processed by the processing circuit 28 so as to measure the subject distance, and the processed signals are supplied to the CPU 26.

Figure 11A:
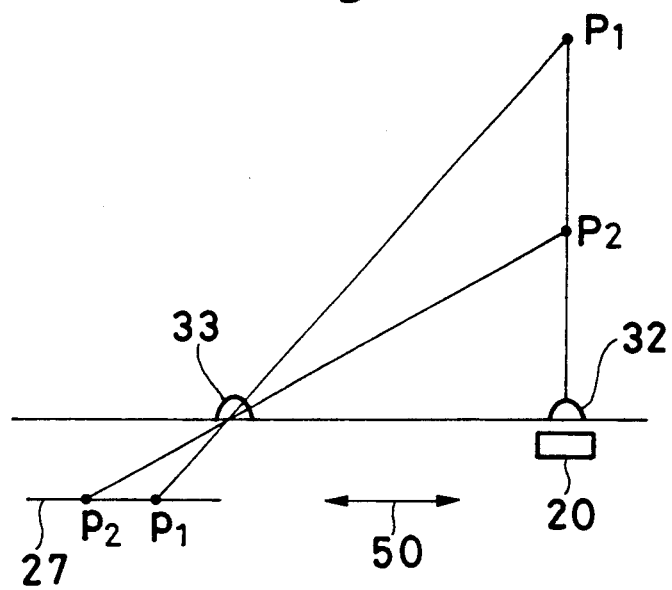
FIG. 11A shows a method of measuring the subject distance in the second embodiment.
Figure 11B:
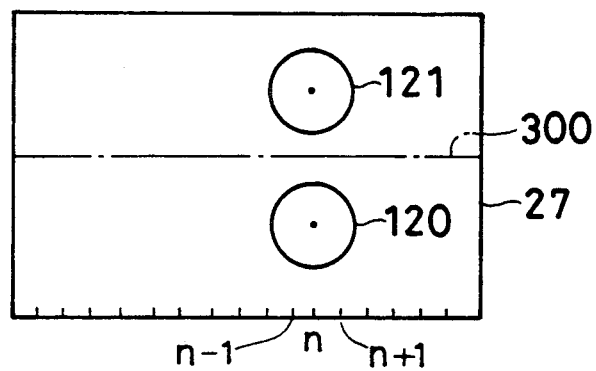
FIG. 11B shows the light receiving device shown in FIG. 11A in the state of receiving the beams.

A method of measuring the subject distance in the second embodiment is shown in FIGS. 11A and 11B. When light beams are projected onto the objects at a distance of P1 and at a distance of P1, respectively, from the light emitting portion 20 through a lens 32, the beams reflected from the objects are received by the light receiving device 27 through a light receiving lens 33. Since the light receiving device 27 receives the beam reflected from the object at a distance of P1 at a position p1 and the beam reflected from the object at a distance of P2 at a position p2 in the direction 50 of the base length, each subject distance is measured from the position at which each beam is received. The AF step number which corresponds to the subject distance is allotted in the direction 50 of the base length to the light receiving device 27 for the purpose of autofocusing control, as shown in FIG. 11B. When the beam projected from the first light emitting device 21 is received in the form of a beam 120, as shown in FIG. 11B, the AF step number of n is detected from the position of the center of gravity thereof. If the subject distance is measured in the state shown in FIG. 12A, the beam projected from the second light emitting device 22 is received in the form of a beam 121, a shown in FIG. 11B. In this case, the AF step number of n is also detected from the position of the center of gravity thereof.

The AF step number is determined by the CPU 26 on the basis of the output of the processing circuit 28. In the above-described case, since the subject distance measured by the second light emitting device 22 agrees with the subject distance measured by the first light emitting device 21, the object is judged to extend beyond the panoramic photography region. The CPU 26 therefore outputs a warning display signal to the finder displaying circuit 31. That is, in the case shown in FIG. 12A, a red lamp 31A is turned on in the finder 8 so as to warn the user that some part of the object will be missing in the photographed image. On the other hand, if the object is within the panoramic photography region (indicating frame 7), as shown in FIG. 12B, the beam projected from the second light emitting device 22 is not received as the beam 121. Therefore, no warning display signal is output, and the detected information on the AF step number is output from the CPU 26 to the lens driving circuit 30. The lens driving circuit 30 moves the photographing lens so as to be focused on the object. The identity of the object within and outside the panoramic photography region is not absolute but some latitude is admitted.

Third Embodiment

Figure 13:
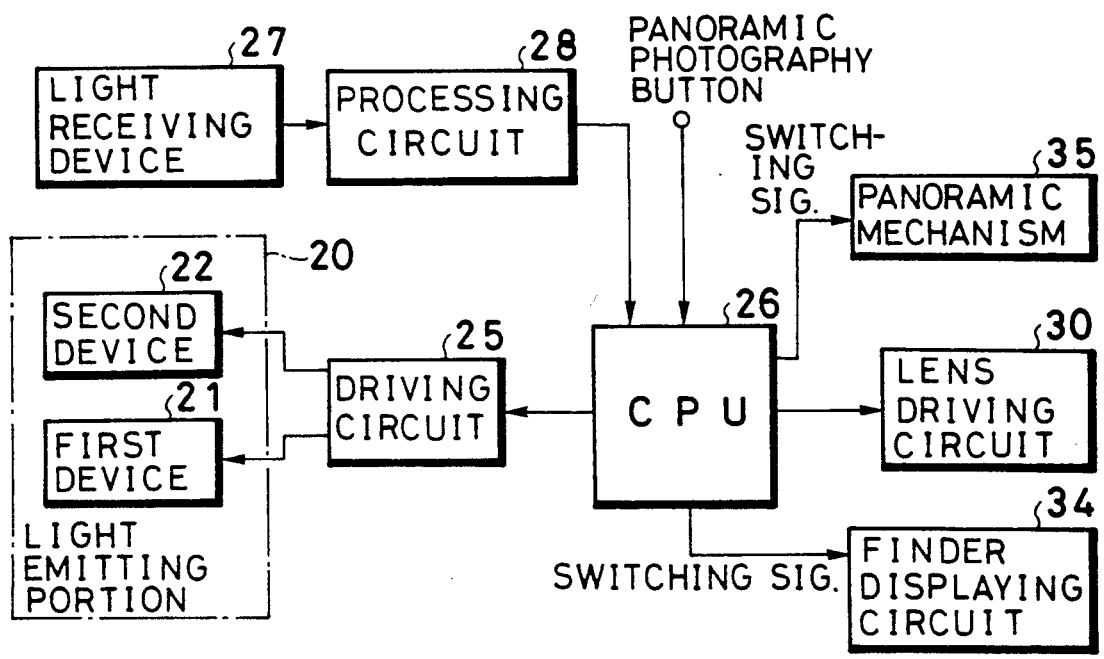
FIG. 13 is a circuit diagram showing the structure of a third embodiment of an autofocusing controlling apparatus according to the present invention.

A third embodiment of the present invention will be explained with reference to FIG. 13. In the third embodiment, when the object of photography is judged to extend beyond the panoramic photography region in the panoramic photography mode, the panoramic photography mode is released and automatically switched over to the ordinary photography mode. In FIG. 13, a finder displaying circuit 34 which is connected to the CPU 26 has a similar structure to that of a conventional finder displaying circuit which is capable of switching the indicating frame 9 in the panoramic photography mode over to the corresponding indicating frame in the ordinary photography mode. A panoramic mechanism 35 is connected to the CPU 26 in the same way as in a conventional device. According to the panoramic mechanism 35, a mask is set at the upper and lower portions of the exposing portion so as to cover the upper and lower portions of the film when the panoramic photography button is pressed. The CPU 26 outputs a switching signal for switching the panoramic photography mode over to the ordinary photography mode to the finder displaying circuit 34 and the panoramic mechanism 35 when the object is judged to extend beyond the panoramic photography region in the panoramic photography mode.

Figure 12A:
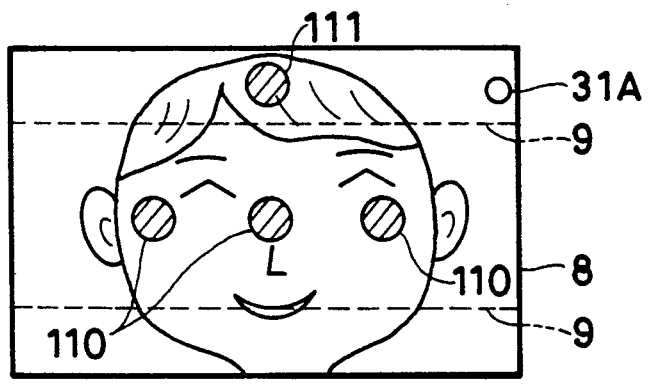
FIG. 12A shows the object of photography displayed in the finder and irradiated with beams when the panoramic photography mode is selected in the second embodiment, this state indicating that some part of the object will be missing in the photographed image.
Figure 12B:
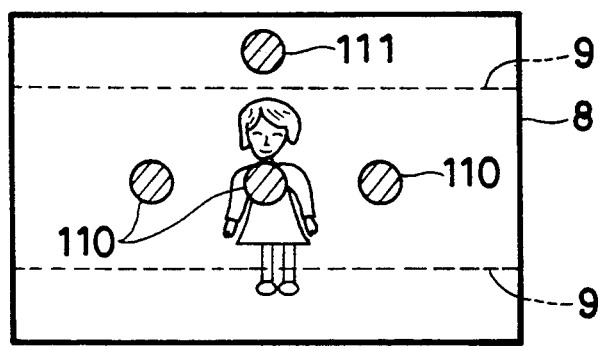
FIG. 12B shows the object displayed in the finder and irradiated with beams when the panoramic photography mode is selected in the second embodiment, this state indicating that no part of the object will be missing in the photographed image.

According to the structure of the third embodiment, when the object is judged to extend beyond the panoramic photography region in the panoramic photography mode, as shown in FIG. 12A, by the subject distance measuring operation by the light emitting portion 20 and the light receiving device 27, the switching signal is output from the CPU 26. In accordance with the switching signal, the finder displaying circuit 34 switches the indicating frame 9 over to the corresponding indicating frame in the ordinary photography mode, and the panoramic mechanism 35 releases the mask which has been set in the panoramic photography mode so as to restore the exposing state to the ordinary one. Consequently, even when a picture is being taken by the user who forgets that the photographing mode is now the panoramic photography mode or mistakes the panoramic photography mode for the ordinary photography mode, the panoramic photography mode is automatically switched over to the ordinary photography mode and, hence, the picture is taken in the ordinary photography mode.

In the second and third embodiments, the second light emitting device 22 is used only to project an upper beam and to judge whether or not the object extends to the upper portion beyond the panoramic photography region. However, the function of the second light emitting device 22 is not restricted thereto. It may be used to project not only an upper beam but also a lower beam and to judge whether or not the object extends to the upper and lower portions beyond the panoramic photography region. Alternatively, the second light emitting device 22 may only project a lower beam so as to judge whether or not the object extends to the lower portion beyond the panoramic photography region.

Although the light receiving device 27 subsequently detects the light beams projected from the light emitting portion 20 in the second and third embodiments, the light receiving device 27 can also divide the light receiving region vertically at the position indicated by the chain line 300 in FIG. 11B in correspondence with the panoramic photography region and detect the separate beams simultaneously.

The warning process in the second embodiment and the automatic photographing mode switching process in the third embodiment are preferably applied to the object which is at a closer distance than a predetermined distance.

As described above, according to the second and third embodiments, since the light emitting device for projecting a beam onto a part of the object outside the panoramic photography region is provided and the subject distance is also measured with respect to that part, it is possible to detect a part of the object outside the panoramic photography mode. When the object is judged to extend beyond the panoramic photography region, by warning the user by the warning means or by automatically switching the panoramic photography mode to the ordinary photography mode, a picture in which some part of the object is missing is prevented from being taken.

Fourth Embodiment

Figure 14:
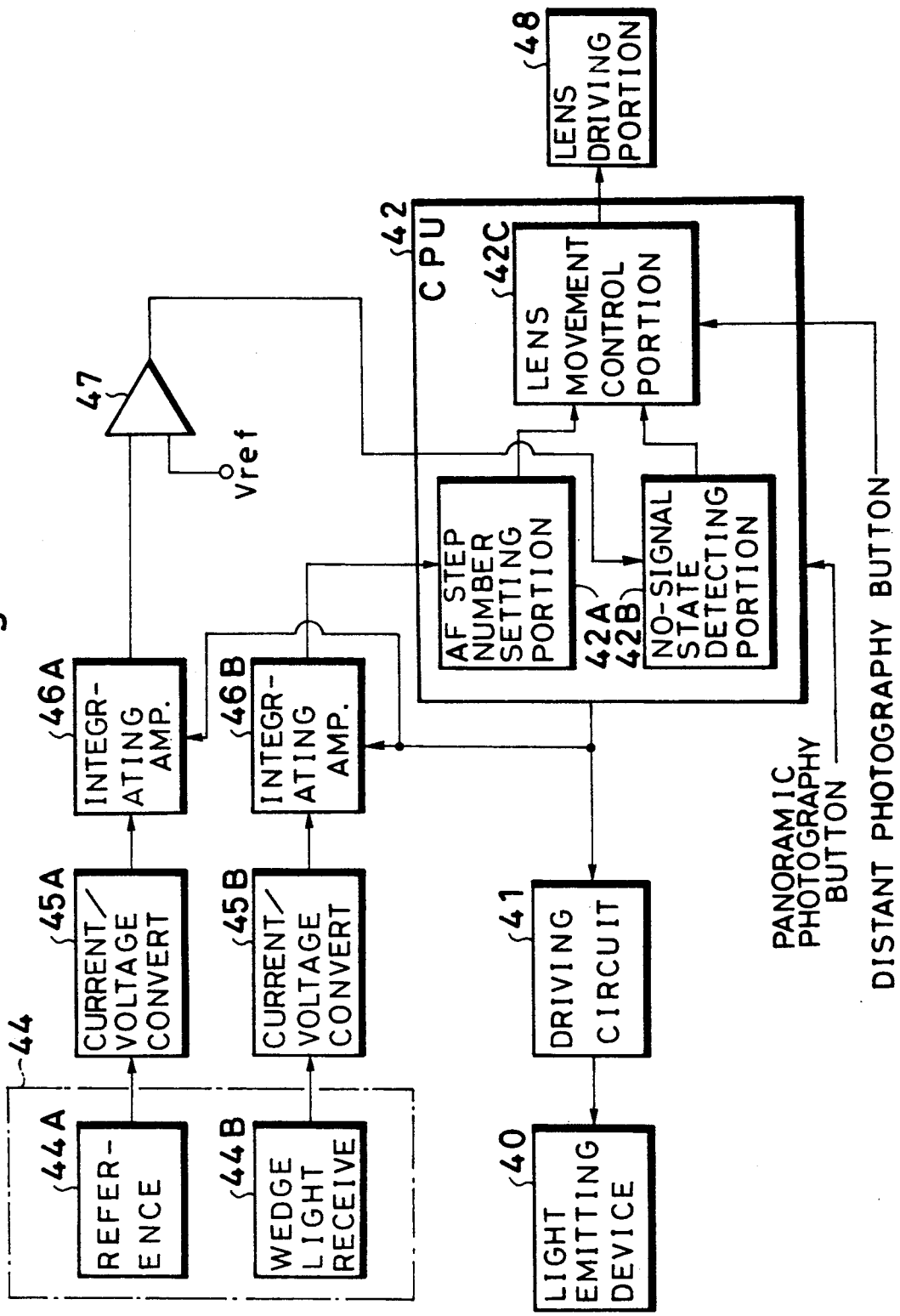
FIG. 14 is a circuit diagram showing the structure of a fourth embodiment of an autofocusing controlling apparatus for a panoramic camera according to the present invention.

FIG. 14 is a circuit diagram showing the structure of a fourth embodiment of an autofocusing controlling apparatus for a panoramic camera according to the present invention. In FIG. 14, a CPU (central processing unit) 42 is connected to a light emitting device 40 which is composed of a light emitting diode for projecting infrared light through a driving circuit 41. When a light emission control signal is output from the CPU 42 to the driving circuit 41, the light emitting device 40 is driven by the driving circuit 41 so as to output pulsating infrared beams to the object of photography.

A light receiving portion 44 is provided with a reference light receiving device 44A and a wedge light receiving device 44B. The reference light receiving device 44A specifies the quantity of light of each beam received. The wedge light receiving device 44B is provided with a wedge-shaped mask. By virtue of the wedge-shaped mask, the quantity of light of each beam changes depending upon the position in the direction of the base length at which the beam is received, so that it is possible to measure the subject distance from the quantity of light of the beam received by the wedge light receiving device 44B. A current/voltage converting amplifier 45A for removing an unnecessary external beam and converting the current of the infrared beam into the voltage thereof and an integrating amplifier 46A for integrating the pulsating infrared beam are connected to the reference light receiving device 44A. In the same way, a current/voltage converting amplifier 45B and an integrating amplifier 46B are connected to the wedge light receiving device 44B.

On the reference light receiving device 44A side, a comparator 47 is provided at the subsequent stage of the integrating amplifier 46A. The comparator 47 compares the reference voltage with the output voltage of the integrating amplifier 46A so as to judge whether or not the quantity of light of the beam received by the reference light receiving device 44A has reached a predetermined quantity of light. The CPU 42 is provided therein with an AF step number setting portion 42A, a no-signal state detecting portion 42B and a lens movement control portion 42C. The output of the comparator 47 is supplied to the no-signal state detecting portion 42B and the output of the integrating amplifier 46B is supplied to the AF step number setting portion 42A. In other words, in this embodiment, whether the current state is a no-signal state or not is determined depending upon whether or not the predetermined quantity of light detected by the comparator 47 has been reached within a predetermined time. In the camera of this embodiment, a distant photography mode is set. By pressing a distant photography button, the distant photography mode is selected in which the amount of lens movement is so controlled that the lens is focused on a distance of not less than 100 m.

When the no-signal state is detected by the no-signal state detecting portion 42B, the lens movement control portion 42C sets the position to which the lens is moved at the position which is set in the distant photography mode. In the camera of this embodiment, the ordinary photography mode is switched over to the panoramic photography mode by pressing the panoramic photography button.

The operation of the fourth embodiment having the above-described structure will be explained hereinunder. When a photography button (first switch S) is pressed, the operation of measuring the subject distance is initiated. Pulsating infrared beams are projected from the light emitting device 40 by the driving circuit 41 in accordance with the light emission control signal which is output from the CPU 42. The beam reflected from the object is received by the reference light receiving device 44A and the wedge light receiving device 44B, and the outputs of these light receiving devices 44A and 44B are processed by the current/voltage converting amplifiers 45A, 45B and the integrating amplifiers 46A and 46B. Thereafter, the output of the integrating amplifier 46A is compared with the reference voltage by the comparator 47, and when the output of the integrating amplifier 46A exceeds the reference voltage, the comparator 47 outputs a "High" signal to the CPU 42. At this time, the no-signal state detecting portion 42B judges whether or not the comparator 47 has output the "High" signal within a predetermined time. If the output from the comparator 47 is not obtained within the predetermined time, it means that no beam reflected from the object has been received. The information on the no-signal state is supplied to the lens movement control portion 42C. The output of the integrating amplifier 46B is supplied to the AF step number setting portion 42A. The AF step number setting portion 42A determines the AF step number on the basis of the information on the subject distance specified by the wedge light receiving device 44B on the basis of the position at which the beam is received, and outputs the AF step number to the lens movement control portion 42C.

When the no-signal state judging portion 42B judges that the output of the comparator 47 has been obtained within the predetermined time and that a beam reflected from the object has been received, the lens movement control portion 42C immediately outputs a lens movement control signal to the lens driving portion 48 in accordance with the AF step number which is set by the AF step number setting portion 42A, so that the lens driving portion 48 moves the photographing lens in the same way as in a conventional autofocusing control. In contrast, when the output of the comparator 47 has not been obtained within the predetermined time and the no-signal state detecting portion 42B detects a no-signal state, the lens movement control portion 42C sets the position to which the photographing lens is moved at a predetermined position which is applied in the distant photography mode, and the photographing lens is moved to the set position.

Figure 15:
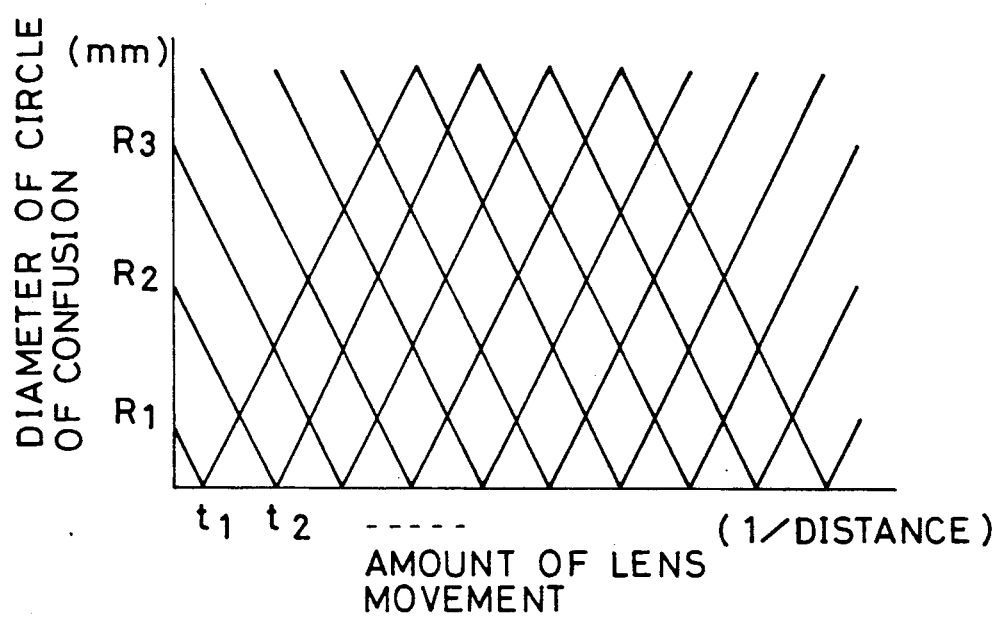
FIG. 15 is a graph showing the relationship between the amount of lens movement and the diameter of a circle of confusion in autofocusing control.
Figure 16:
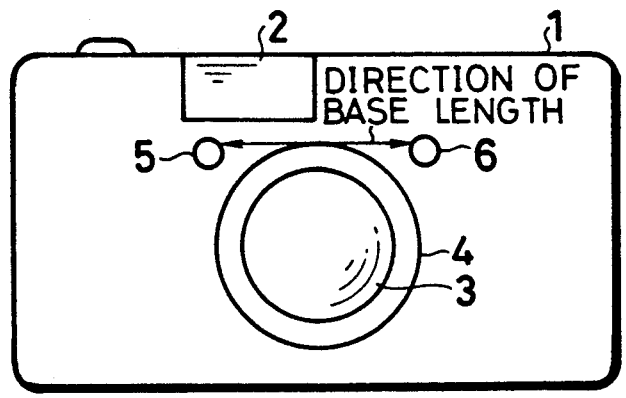
FIG. 16 shows the structure of the front surface of a camera.

FIG. 15 shows the relationship between the amount of lens movement and the diameter of a circle of confusion in autofocusing control. The diameter of a circle, which indicates the degree of unfocusedness, is, for example, 0.02 mm at R1, 0.06 mm at R2 and 0.10 mm at R3. In a conventional apparatus, the position to which the photographing lens is moved is t2 (about 17 m) in FIG. 15 in the no-signal state. In contrast, in this embodiment, the position is set at t1 in the no-signal state, which is the same position as in the distant photography mode. In this embodiment, the photographing mode is set at the distant photography mode by the operation of the distant photography button in the same way as in a conventional apparatus.

As described above, when the no-signal state is detected in the fourth embodiment, the photographing mode is set at the distant photography mode. In this way, since the lens is focused on the object at a longer distance than in a conventional apparatus, a picture is often taken from a comparatively long distance, so that the enlargement ratio of the panoramic picture is enhanced and the resolution thereof is improved.

In the fourth embodiment, active autofocusing control using infrared light is executed, but the present invention is also applicable to autofocusing control using other means such as ultrasonic waves. In addition, although the above-described embodiments are applied to a camera which selectively enables both ordinary photography and panoramic photography, it goes without saying that the present invention is applicable to a camera exclusively for panoramic photography.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An autofocusing controlling apparatus for a camera comprising:
    a light emitting portion for projecting multiple beams onto the object of photography;
    a light receiving portion for receiving each of said beams reflected from said object and outputting the information on the subject distance measured on the basis of the position at which each beam is received; and
    a beam breakage judging means for judging whether or not there is a breakage in each of said multiple beams which are received by said light receiving portion,
    wherein the beam which has no breakage or the least breakage in the direction of the base length which connects said light emitting portion and said light receiving portion is selected on the basis of the output of said beam breakage judging means, and autofocusing control is executed on the basis of the information on said subject distance measured by the selected beam.

2. An autofocusing controlling apparatus for a camera according to claim 1, wherein said beam breakage judging means measures the quantity of light of each of said multiple beams and judges the beam which has obtained a predetermined quantity of light in the shortest time or by the smallest number of times of light emission to be the beam having no breakage.

3. An autofocusing controlling apparatus for a camera according to claim 1, wherein said beam breakage judging means measures the intensity of each of said multiple beams and judges the beam which has the strongest intensity to be the beam having no breakage.

4. An autofocusing controlling apparatus for a camera according to claim 1, wherein said light emitting portion and said light receiving portion are disposed in a horizontal or vertical line.

5. An autofocusing controlling apparatus for a camera according to claim 1, further comprising a comparator, wherein said light emitting portion projects three beams and said light receiving portion includes a reference light receiving device and a wedge light receiving device, the quantity of light of the beam detected by said reference light receiving device is compared with the reference value by said comparator, and after the state of each beam is judged from the output of said comparator and the number of times of light emission, said subject distance is measured on the basis of the outputs of said reference light receiving device and said wedge light receiving device.

6. An autofocusing controlling apparatus for a camera according to claim 5, wherein said three beams are right, center and left beams and said number of times of light emission of each of said right and left beams from which the state of each beam is judged is smaller than that of said center beam.

* * * * *